United States Patent
Badger et al.

(10) Patent No.: US 10,927,821 B2
(45) Date of Patent: Feb. 23, 2021

(54) CONTROLLING HEATING ELEMENTS IN A WIND TURBINE SYSTEM

(71) Applicant: VESTAS WIND SYSTEMS A/S, Aarhus N (DK)

(72) Inventors: Paul Badger, Salisbury (GB); Luke Spandley, Ventnor (GB); Stephen Buggy, Cowes (GB); Karl Gregory, Cowes (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 152 days.

(21) Appl. No.: 16/090,105

(22) PCT Filed: Mar. 30, 2017

(86) PCT No.: PCT/DK2017/050097
§ 371 (c)(1),
(2) Date: Sep. 28, 2018

(87) PCT Pub. No.: WO2017/167346
PCT Pub. Date: Oct. 5, 2017

(65) Prior Publication Data
US 2019/0113025 A1    Apr. 18, 2019

(30) Foreign Application Priority Data
Mar. 31, 2016 (DK) .......................... PA 2016 70180

(51) Int. Cl.
*H05B 1/02* (2006.01)
*F03D 80/40* (2016.01)
*H05B 3/34* (2006.01)

(52) U.S. Cl.
CPC .............. *F03D 80/40* (2016.05); *H05B 3/34* (2013.01); *F05B 2270/32* (2013.01);
(Continued)

(58) Field of Classification Search
CPC .................. F03D 80/40; F05B 2270/32; F05B 2270/325; F05B 2270/327;
(Continued)

(56) References Cited

U.S. PATENT DOCUMENTS 9,488,157 B2 * 11/2016 Baker ..................... F03D 7/022
2005/0184193 A1    8/2005 Bourjac et al.
(Continued)

FOREIGN PATENT DOCUMENTS

| CA | 2910331 A1 | 10/2014 |
|---|---|---|
| CN | 103034271 A | 4/2013 |

(Continued)

OTHER PUBLICATIONS

PCT International Search Report for Application No. PCT/DK2017/050097 dated Jun. 16, 2017.
(Continued)

*Primary Examiner* — Mark H Paschall
(74) *Attorney, Agent, or Firm* — Patterson + Sheridan, LLP

(57) ABSTRACT

Examples are generally directed to techniques for controlling a temperature of a blade in a wind turbine system. One example of the present disclosure is a method of controlling a temperature of a blade in a wind turbine system. The method includes setting a target temperature, inputting physical conditions of the blade and ambient conditions about the blade into a processor, outputting a minimum amount of energy to a heating element of the blade required to reach the target temperature based on the physical conditions and ambient conditions, and adjusting the energy provided to the heating element to reach the target temperature.

20 Claims, 10 Drawing Sheets

(52) U.S. Cl.
CPC ... *F05B 2270/325* (2013.01); *F05B 2270/327* (2013.01); *F05B 2270/328* (2013.01); *Y02E 10/72* (2013.01)

(58) Field of Classification Search
CPC ....... F05B 2270/328; H05B 1/02; H05B 3/34; H05B 1/0233; H05B 3/0038; H05B 2214/02
USPC ................ 219/490, 494, 497, 506, 202, 492
See application file for complete search history.

(56) References Cited

U.S. PATENT DOCUMENTS

| | | |
|---|---|---|
| 2010/0119370 A1 | 5/2010 | Myhr |
| 2015/0023792 A1 | 1/2015 | Spitzner et al. |
| 2016/0025069 A1 | 1/2016 | Hilling |
| 2016/0040654 A1* | 2/2016 | Cuoghi .................. F03D 17/00 416/1 |
| 2016/0084231 A1 | 3/2016 | Runge et al. |
| 2019/0063407 A1* | 2/2019 | Roeper .................. F03D 80/40 |

FOREIGN PATENT DOCUMENTS

| | | |
|---|---|---|
| CN | 203452981 U | 2/2014 |
| EP | 3048296 A1 | 7/2016 |
| WO | 2013004888 A2 | 1/2013 |
| WO | 2017167346 A1 | 10/2017 |

OTHER PUBLICATIONS

Danish Patent and Trademark Office, 1st Technical Examination for Application No. PA 2016 70180 dated Nov. 9, 2016.
PCT Written Opinion of the International Searching Authority for Application No. PCT/DK2017/050097.

* cited by examiner

800

| | LOCATION | | ENVIRONMENT | | | TARGET | POWER |
|---|---|---|---|---|---|---|---|
| | RADIUS | CHORD | RPM | TSTART | LWC | TMAX | HF |
| A | 60 | 10% | 13 | -5 | 0.1 | +5 | 8.2 |
| A | 60 | 10% | 13 | -6 | 0.1 | +5 | 8.4 |
| A | 60 | 10% | 13 | -7 | 0.1 | +5 | 8.6 |
| A | 60 | 10% | 13 | -8 | 0.1 | +5 | 8.8 |
| A | 60 | 10% | 13 | -9 | 0.1 | +5 | 9 |
| A | 60 | 10% | 13 | -10 | 0.1 | +5 | 9.2 |
| A | 60 | 10% | 13 | -11 | 0.1 | +5 | 9.4 |
| A | 60 | 10% | 13 | -12 | 0.1 | +5 | 9.6 |
| B | 50 | 30% | 13 | -5 | 0.1 | +5 | 6.3 |
| B | 50 | 30% | 13 | -6 | 0.1 | +5 | 6.48 |
| B | 50 | 30% | 13 | -7 | 0.1 | +5 | 6.66 |
| B | 50 | 30% | 13 | -8 | 0.1 | +5 | 6.84 |
| B | 50 | 30% | 13 | -9 | 0.1 | +5 | 7.02 |
| B | 50 | 30% | 13 | -10 | 0.1 | +5 | 7.2 |
| B | 50 | 30% | 13 | -11 | 0.1 | +5 | 7.38 |
| B | 50 | 30% | 13 | -12 | 0.1 | +5 | 7.56 |
| C | 30 | 20% | 13 | -5 | 0.1 | +5 | 3.3 |
| C | 30 | 20% | 13 | -6 | 0.1 | +5 | 3.395 |
| C | 30 | 20% | 13 | -7 | 0.1 | +5 | 3.49 |
| C | 30 | 20% | 13 | -8 | 0.1 | +5 | 3.585 |
| C | 30 | 20% | 13 | -9 | 0.1 | +5 | 3.68 |
| C | 30 | 20% | 13 | -10 | 0.1 | +5 | 3.775 |
| C | 30 | 20% | 13 | -11 | 0.1 | +5 | 3.87 |
| C | 30 | 20% | 13 | -12 | 0.1 | +5 | 3.965 |
| D | 42 | 75% | 13 | -5 | 0.1 | +5 | 2.8 |
| D | 42 | 75% | 13 | -6 | 0.1 | +5 | 2.905 |
| D | 42 | 75% | 13 | -7 | 0.1 | +5 | 3.01 |
| D | 42 | 75% | 13 | -8 | 0.1 | +5 | 3.115 |
| D | 42 | 75% | 13 | -9 | 0.1 | +5 | 3.22 |
| D | 42 | 75% | 13 | -10 | 0.1 | +5 | 3.325 |
| D | 42 | 75% | 13 | -11 | 0.1 | +5 | 3.43 |
| D | 42 | 75% | 13 | -12 | 0.1 | +5 | 3.535 |

FIG. 8

CONTROLLING HEATING ELEMENTS IN A WIND TURBINE SYSTEM

BACKGROUND

Field

Examples presented in this disclosure generally relate to techniques for controlling a temperature of a blade in a wind turbine system based on ambient conditions and physics modeling.

Description of the Related Art

Modern power generation and distribution networks increasingly rely on renewable energy sources, such as wind turbines. In some cases, the wind turbines may be substituted for conventional, fossil fuel-based generators. The formation of ice on the surface of the blades of a wind turbine is a relatively common problem, even in moderate climates. The build-up and spread of ice on the blade surface, in particular on the tip portion of the blade, changes the blade aerodynamics and may also lead to increased vibrations and loading on the blade, all of which lead to a reduction in power output. In more severe cases, the turbine may need to be shut down upon accumulation of ice to prevent excessive loading of the blades, which may damage or prematurely fatigue the blade components.

To prevent ice from accumulating on the blades, the wind turbines have been equipped with heating systems. The heating systems prevent the accumulation of ice on blades (anti-icing) and remove the ice from the blades after the ice accumulation (de-icing). A plurality of electro-thermal heat (ETH) panels may be utilized as a heating system. The ETH panels may be embedded in each blade and powered on to prevent ice accumulation. Conventional systems use positive feedback from temperature sensors attached to or mounted near the ETH panels to control the heating of a blade. For example, when the measured temperature is below a threshold value, the ETH panel is turned on; if the measured temperature is above a threshold value, the ETH panel is turned off. As heating systems become more complex, the number of ETH panels used in a single blade increases. Thus, the number of sensors required for the positive feedback system increases, which increases the complexity of the controller hardware.

Therefore, there is a need for an improved heating system.

SUMMARY

One example of the present disclosure is a method of controlling a temperature of a blade in a wind turbine system. The method includes setting a target temperature, inputting physical conditions of the blade and ambient conditions about the blade into a processor, outputting a minimum amount of energy to a heating element of the blade required to reach the target temperature based on the physical conditions and ambient conditions, and adjusting the energy provided to the heating element to reach the target temperature.

Another example of the present disclosure relates to a system for controlling a temperature of a blade in a wind turbine system. The system includes a processor and a memory. The memory stores program code, which, when executed on the processor, performs an operation for controlling a temperature of a blade in a wind turbine system. The operation includes setting a target temperature, inputting physical conditions of the blade and ambient conditions about the blade into a processor, outputting a minimum amount of energy to a heating element of the blade required to reach the target temperature based on the physical conditions and ambient conditions, and adjusting the energy provided to the heating element to reach the target temperature.

Another example of the present disclosure relates to a computer readable storage medium for controlling a temperature of a blade in a wind turbine system. The computer readable storage medium has stored thereon instructions that, when executed by a processor, cause the processor to perform a method of controlling a temperature of a blade in a wind turbine system. The method includes setting a target temperature, inputting physical conditions of the blade and ambient conditions about the blade into a processor, outputting a minimum amount of energy to a heating element of the blade required to reach the target temperature based on the physical conditions and ambient conditions, and adjusting the energy provided to the heating element to reach the target temperature.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

FIG. 8 is a chart that is generated using temperature control code, according to one example.

To facilitate understanding, identical reference numerals have been used, where possible, to designate identical elements that are common to the figures. It is contemplated that elements disclosed in one example may be beneficially utilized on other examples without specific recitation.

DESCRIPTION OF EXAMPLE EMBODIMENTS

Examples are generally directed to techniques for controlling a temperature of a blade in a wind turbine system. One example of the present disclosure is a method of controlling a temperature of a blade in a wind turbine system. The method includes setting a target temperature, inputting physical conditions of the blade and ambient conditions about the blade into a processor, outputting a minimum amount of energy to a heating element of the blade required to reach the target temperature based on the physical conditions and ambient conditions, and adjusting the energy provided to the heating element to reach the target temperature.

Figure 1:
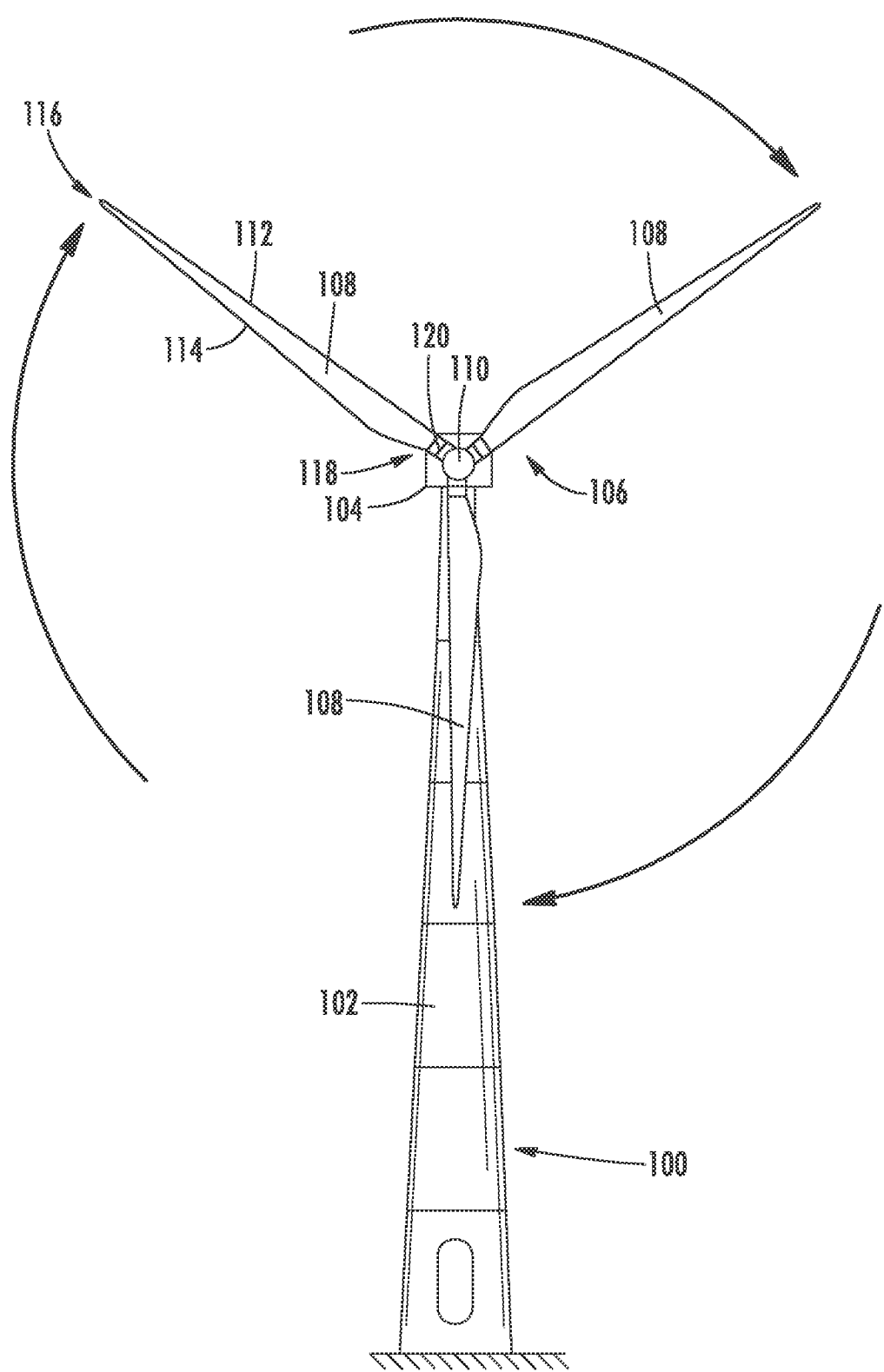
FIG. 1 illustrates a diagrammatic view of a horizontal-axis wind turbine generator (WTG), according to one example.

FIG. 1 illustrates a diagrammatic view of a horizontal-axis wind turbine generator (WTG) 100. The WTG 100 typically includes a tower 102 and a nacelle 104 located at the top of the tower 102. A wind turbine rotor 106 may be connected with the nacelle 104 through a low speed shaft extending out of the nacelle 104. As shown, the wind turbine rotor 106 includes three rotor blades 108 mounted on a common hub 110, but may include any suitable number of blades, such as two, four, five, or more blades. The blade 108 typically has an aerodynamic shape with a leading edge 112 for facing into the wind, a trailing edge 114 at the opposite end of a chord for the blade 108, a tip 116, and a root 118 for attaching to the hub 110 in any suitable manner. For some examples, the blades 108 may be connected to the hub 110 using pitch bearings 120 such that each blade 108 may be rotated around its longitudinal axis to adjust the blade's pitch.

Figure 2:
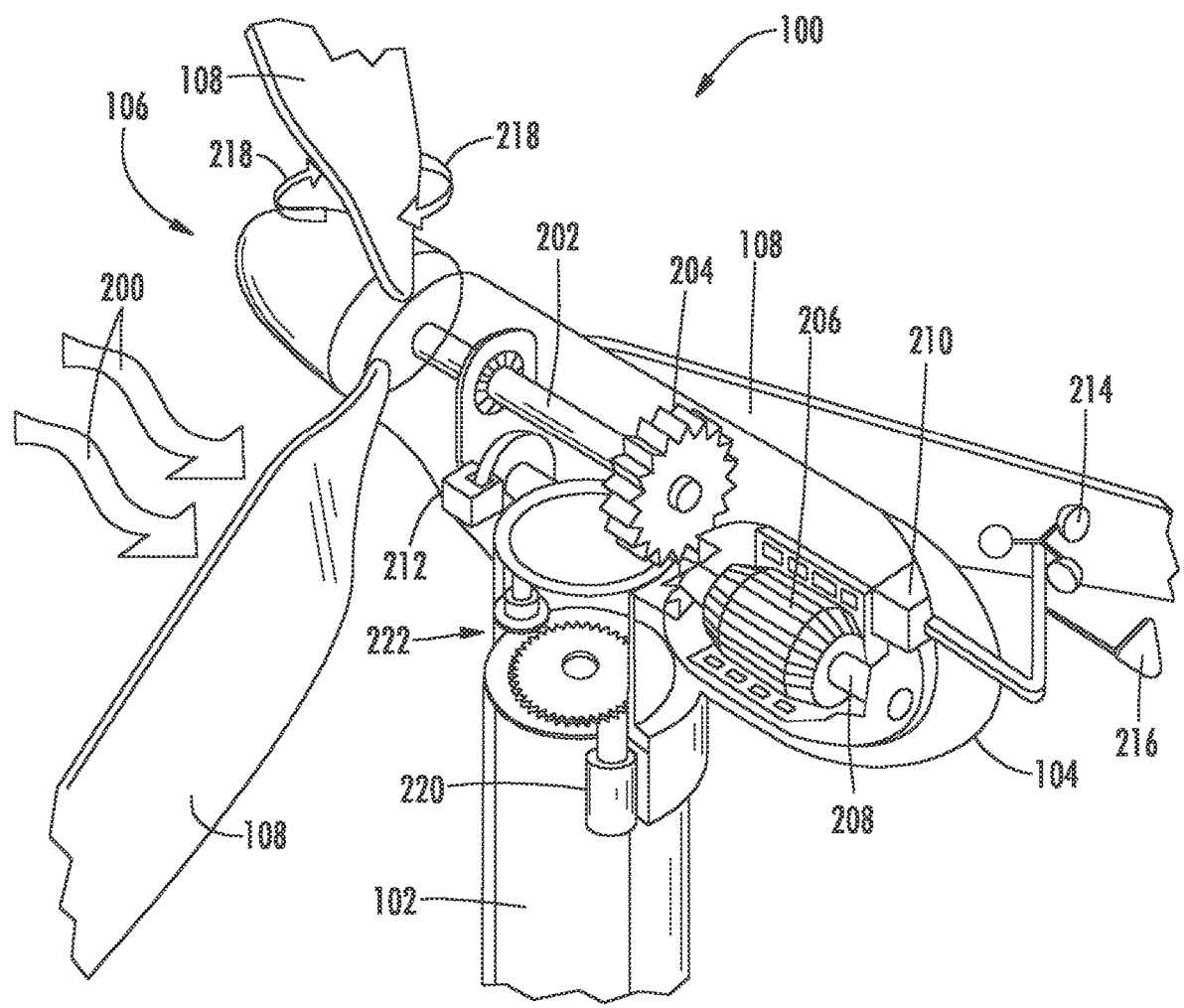
FIG. 2 illustrates a diagrammatic view of typical components internal to the nacelle and tower of the WTG of FIG. 1, according to one example.

FIG. 2 illustrates a diagrammatic view of typical components internal to the nacelle 104 and tower 102 of the WTG 100. When the wind 200 impacts on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206. The WTG 100 may also include a braking system 212 for emergency shutdown situations and/or for locking the rotor in a required position.

A controller 210 may sense the rotational speed of one or both of the shafts 202, 208. The controller 210 may receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
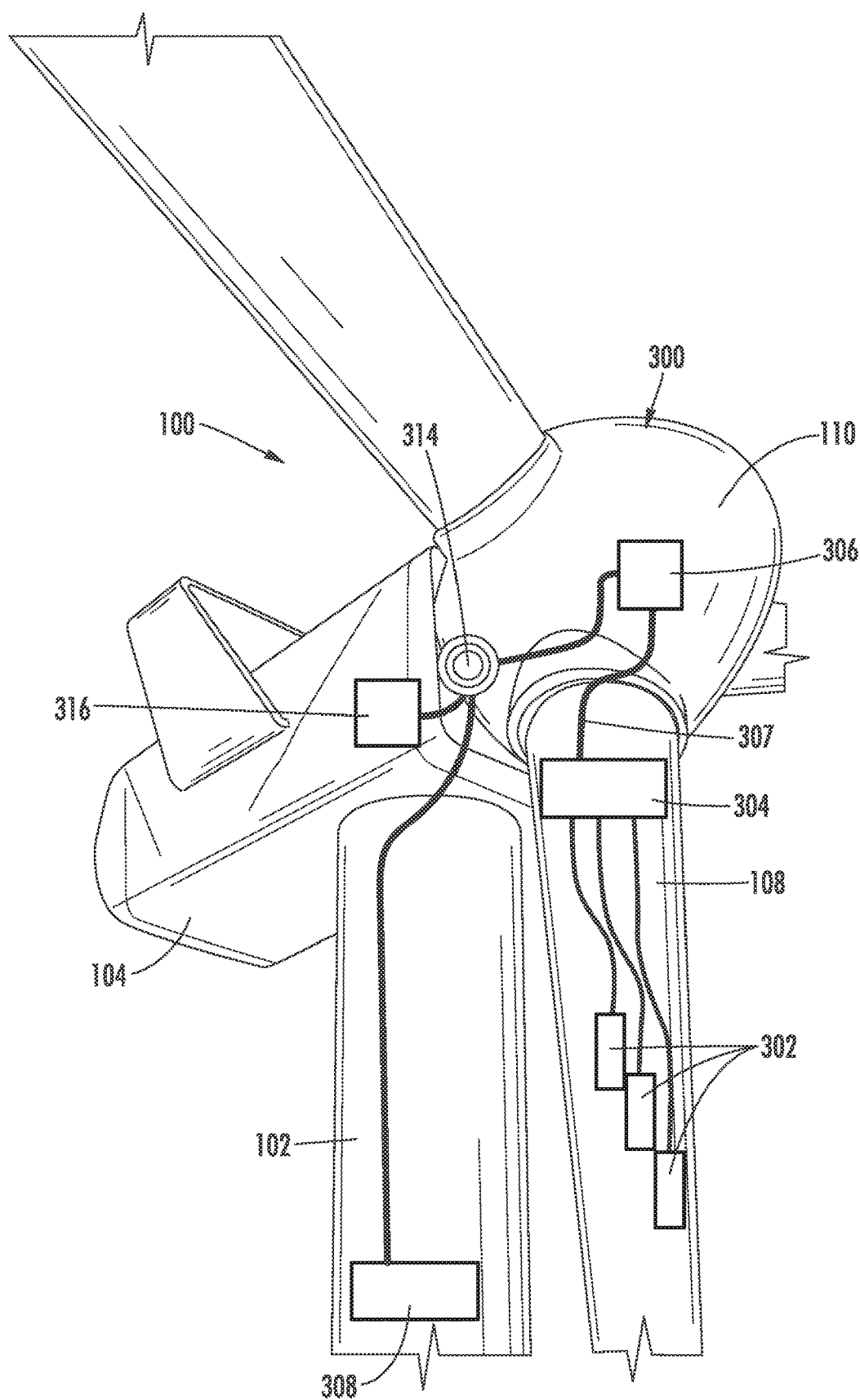
FIG. 3 is a schematic view of a control system for one or more electro-thermal heating (ETH) panels inside the WTG of FIG. 1, according to one example.

In cold climate regions, ice may form on the blades 108, which can reduce the speed of the rotation of the blades 108. In order to maintain an ice free surface on the blades 108, one or more Electro Thermal Heat (ETH) panels may be utilized. FIG. 3 is a schematic view of a control system 300 for one or more ETH panels 302 inside the WTG 100. The control system 300 may include a plurality of blade control and power distribution boxes 304, hub control and power distribution box 306, a slip ring 314, a power source 316, and a system controller 308. The one or more ETH panels 302 may be embedded in each blade 108 and may be controlled by blade control and power distribution boxes 304 located in the root 118 of each blade 108. There may be one blade control and power distribution boxes 304 for each blade 108. In one example, there are up to 32 ETH panels 302 embedded in each blade 108, such as 16 ETH panels 302 covering the windward blade surface and 16 ETH panels 302 covering the leeward blade surface. In one example, the one or more ETH panels 302 cover the entire blade 108 except for the root 118. Electrical power may be supplied to the one or more ETH panels 302 from blade power and distribution box 304 located in the blade root. The blade power and distribution box 304 may include relays for switching on and off the one or more ETH panels 302 in each blade 108. The blade power and distribution box 304 may also include lightning protection components. From the blade power and distribution box 304, power cables are routed to each ETH panel 302. In one example, the WTG 100 includes three blades and three power cables 307, and each power cable 307 connects the hub power and distribution box 306 to a corresponding blade power and distribution box 304 located in a corresponding blade 108.

The hub control and power distribution box 306 may be electrically connected a slip ring 314 located inside the nacelle 104. The slip ring 314 may be electrically connected to a power source 316 located inside the nacelle 104. The power source 316 may include a circuit breaker switch to allow the system to be de-energized. Electrical power may be supplied from the power source 316 through the hub interface of the nacelle 104 via the slip ring 314 and may be supplied to the one or more ETH panels 302 in each blade 108 via the slip ring 314, the hub control and power distribution box 306, and the blade control and power distribution box 304. The control and operation of the control system 300 may be achieved by remote connection via the system controller 308 and communication through the slip ring 314. In one example, the system controller 308 may be a standalone system. In another example, the system controller 308 may be embodied within the turbine controller. The system controller 308 may be connected to the slip ring 314 to allow communication to the hub control and power distribution box 306. Each blade control and power distribution Box 304 may be electrically connected to a communication link through the slip ring 314. Control signals provided to the blade control and power distribution box 304 from the system controller 308 are communicated through the slip ring 314. In one example this may be through a wireless link. In another example this may be through and electrical or optical fibre link.

The control system 300 may utilize duty cycling (i.e., switching on and off relays over a period of time) to achieve power distribution across the one or more ETH panels 302 in each blade 108. During severe icing conditions ideally all of the ETH panels 302 embedded in the blades 108 should be switched on continuously. The slip ring 314 may have a power or current constraint which will restrict the energy drawn from the power source 316 to the ETH Panels 302. To maximize the potential power available to the ETH panels 302, the control system 300 will focus on a fixed and predetermined set of zones having combined energy consumption less than the capabilities of the slip ring 314.

Figure 4A:
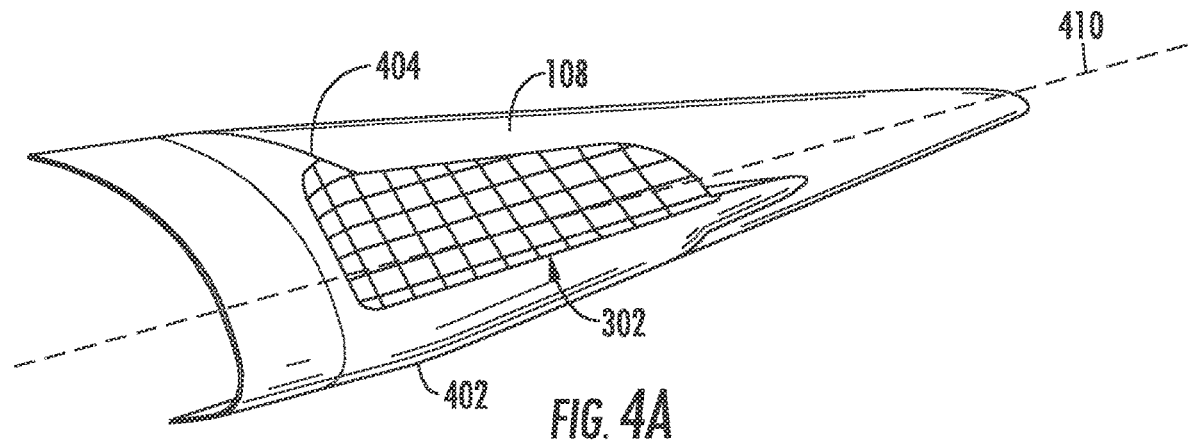
FIGS. 4A-4B are perspective views of the blade of FIG. 1, showing a portion of the embedded ETH panel, according to one example.

FIG. 4A is a perspective view of the blade 108 showing a portion of the embedded ETH panel 302. As shown, the ETH panel 302 may be embedded in the blade 108, such as between a first layer 402 and a second layer 404 of the blade

Figure 4B:
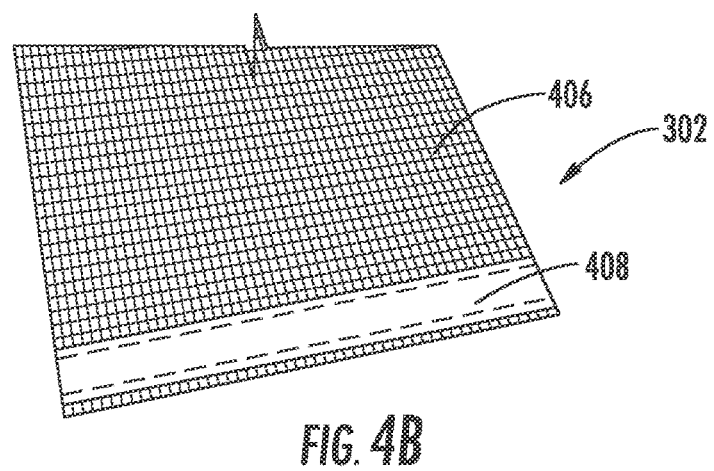

108. The ETH panel 302 may be any suitable resistive heating element. In one example, each ETH panel 302 includes a carbon mesh 406 and a busbar 408 disposed across the carbon mesh 406 for supplying power to the carbon mesh 406, as shown in FIG. 4B.

Figure 5A:
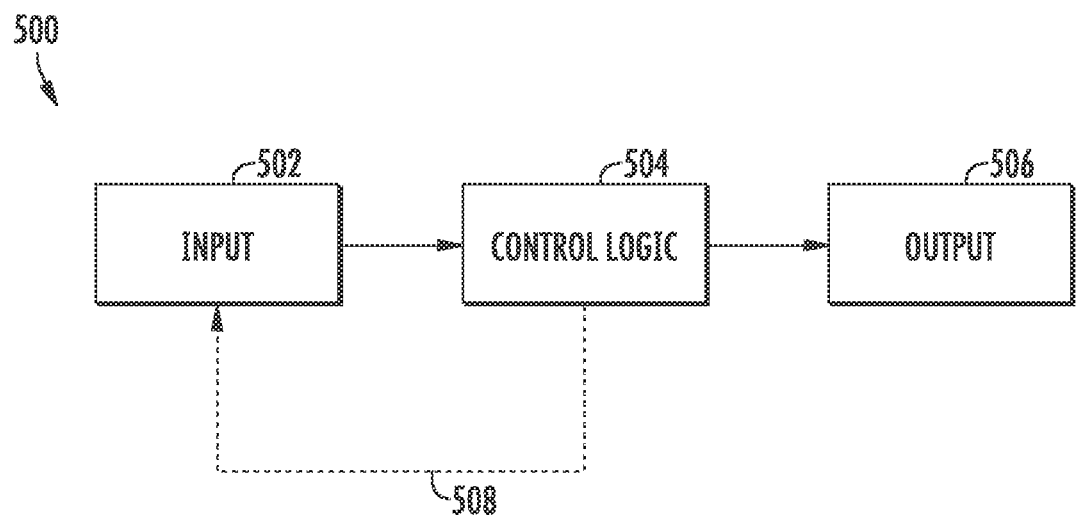
FIG. 5A illustrates a conventional system for controlling temperature of a blade in a wind turbine system.

Conventional systems use positive feedback from temperature sensors attached to or mounted near the ETH panels to control the temperature of a blade in a wind turbine system. For example, when the measured temperature is below a given value, the ETH panel is turned on; if, however, the measured temperature is above a target value the ETH panel is turned off. FIG. 5A illustrates an example of conventional system 500 for controlling temperature of a blade in a wind turbine. The system 500 includes an input 502, control logic 504, and output 506. The input 502 is provided to the control logic 504. In the conventional system 500, the input 502 is a current temperature measured by temperature sensors positioned on each ETH panel in each blade. The control logic 504 determines whether the temperature provided by the input 502 exceeds a target temperature. Based on this determination, the control logic 504 generates an output 506. If the control logic 504 determines that the temperature provided by input 502 exceeds the target temperature, then the control logic 504 generates the output 506 to stop providing energy to the ETH panels in the blade. If, however, the control logic 504 determines that the temperature does not exceed the target temperature, then the control logic 504 generates an output 506 that continues to provide energy to the ETH elements. The input 502 continually provides temperature readings to the control logic 504, which, in turn, continually generates an output 506. This continual process creates a feedback loop 508 between the control logic 504 and the input 502 so that the system continuously monitors the temperature of the ETH elements in the blade.

As heating systems become more complex, the number of ETH panels used in a single blade increases. Thus, the number of sensors required for the positive feedback system increases, which increases the complexity of the controller hardware.

Figure 5B:
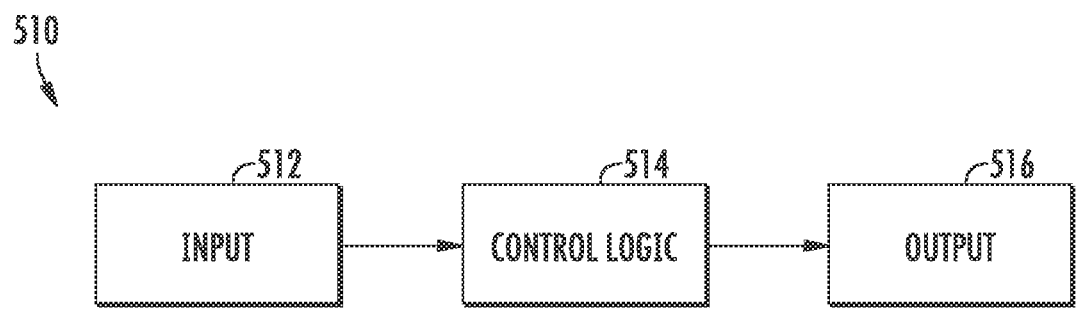
FIG. 5B illustrates an improved system for controlling temperature of a blade in a wind turbine system, according to one example.

FIG. 5B illustrates an improved system 510 for controlling temperature of a blade in a wind turbine system, according to one example. The system 510 includes an input 512, control logic 514, and output 516. The input 512 is provided to the control logic 514. The input 512 may include information such as physical conditions of the blade and ambient conditions surrounding the blade. The control logic 514 takes the input 512 and generates an output 516. For example, the output 516 may be an amount of energy to be provided to the ETH panel. The input 512 continually provides information to the control logic 514, which in turn continually generates output 516. The system 510 differs from the conventional system 500 by removing the need for a feedback loop. There is no longer a need for the feedback loop because the input 512 is no longer dependent on the determination of the control logic 514. Thus, the temperature of a blade in a wind turbine may be controlled without the need of temperature sensors on each ETH panel, which decreases the complexity of the controller hardware.

Figure 6:
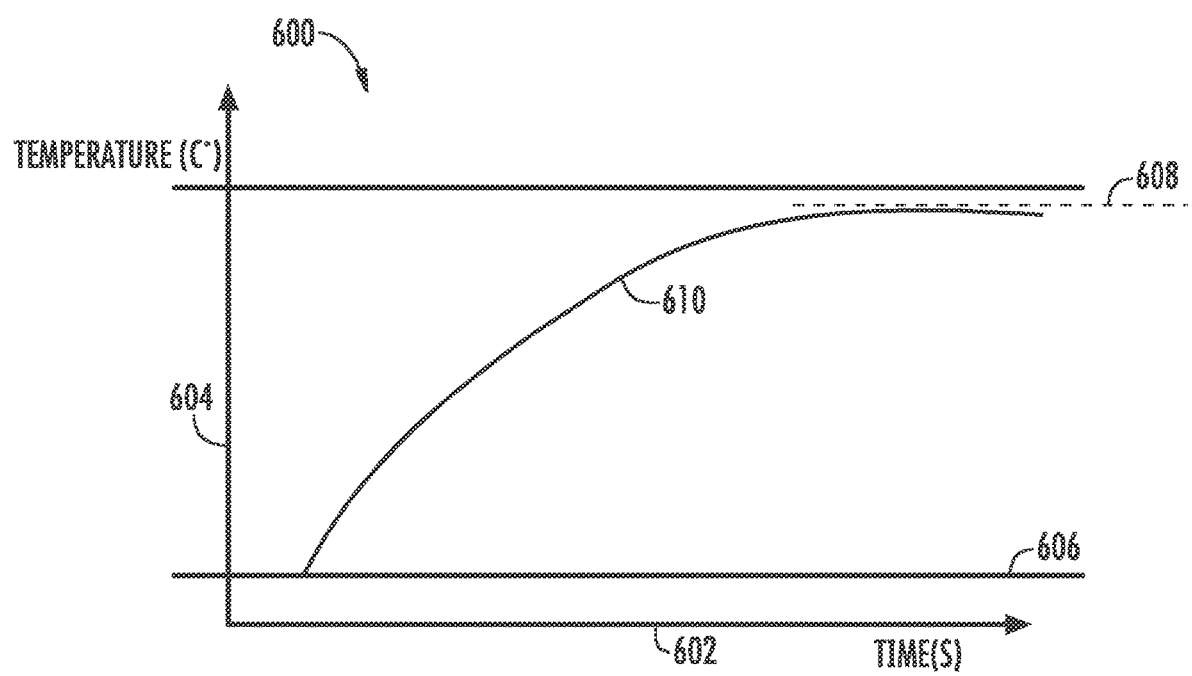
FIG. 6 is a graph illustrating a relationship between temperature and time of a heated object, according to one example.

FIG. 6 illustrates a graph 600 depicting a relationship between a temperature of an object and an amount of time that object is heated. In graph 600, time is depicted along the x-axis 602 and temperature is depicted along the y-axis 604. Line 606 designates an initial temperature of an object. Line 608 designates an end temperature of the object. As the object is heated over time, the temperature of the object gradually rises, creating a heating curve 610. At a certain point, the heating curve 610 plateaus. Depending on the material of the object and the energy supplied, the heating curve for that object may differ due to how quickly or slowly the temperature of the object rises over time. The ending temperature is the point at which the temperature of the object begins to plateau, known as the equilibrium point.

System 510 is configured to create a function that takes inputs 512 to generate an output 516 such that the blade may reach a target temperature at the end temperature line 608. This may be done by tailoring a function to be dependent on ambient conditions surrounding the blade and physical conditions of the blade to generate a minimum amount of energy such that the target temperature occurs at the end temperature line 608 in graph 600, i.e., where the heating curve plateaus.

Figure 7:
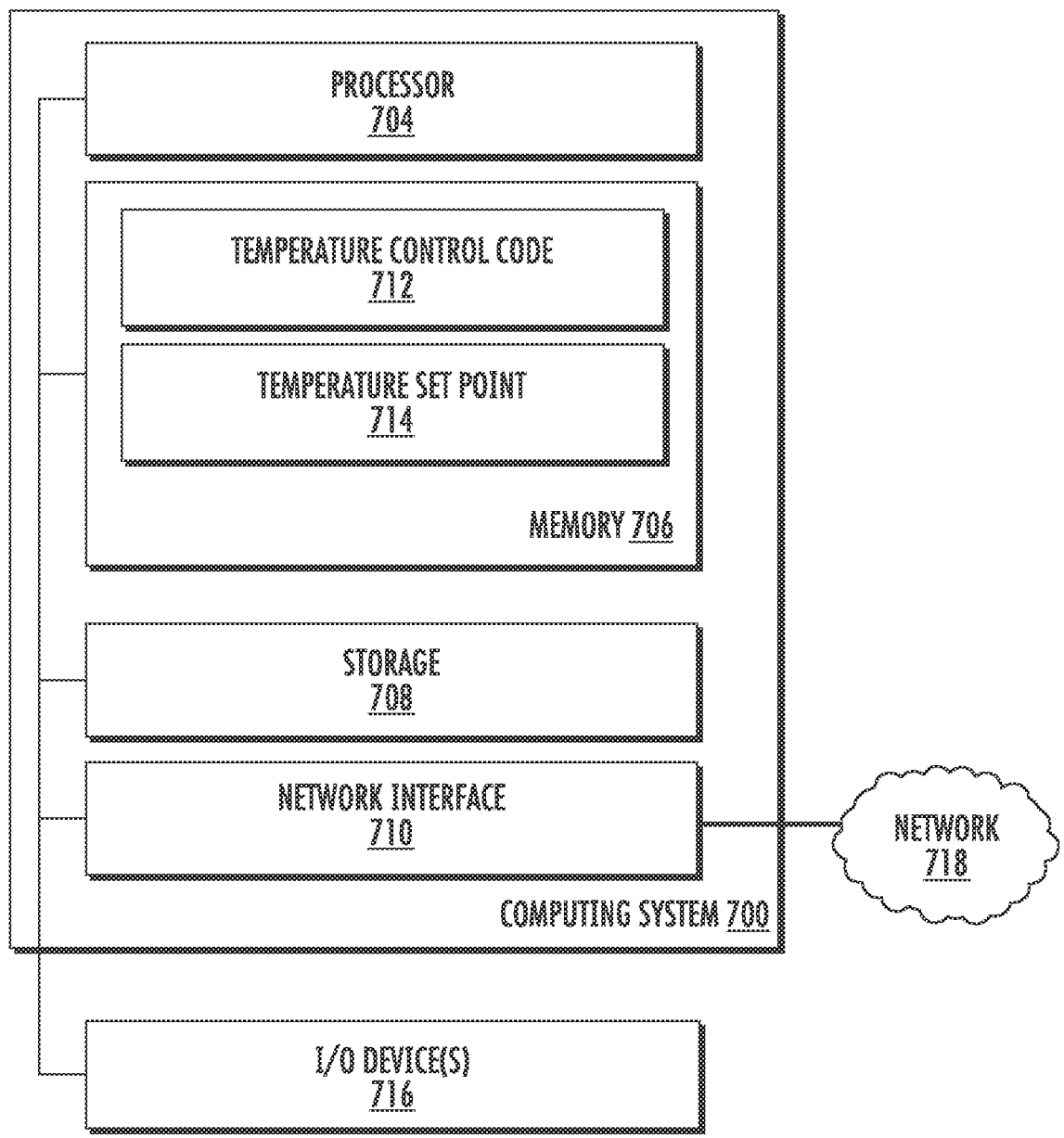
FIG. 7 illustrates one example of a computing system, which is configured to carry out a method for controlling the temperature of a blade in a wind turbine system.

FIG. 7 illustrates one example of a computing system 700, such as system controller 308, which is configured to carry out a method for controlling the temperature of a blade in a wind turbine system. The computing system 700 includes a processor 704, a memory 706, storage 708, and a network interface 710. The processor 704 is included to be representative of a single processor, multiple processors, a single processor having multiple processing cores, and the like. The storage 708 may be a hard disk drive or a solid state drive or embedded RAM. Although shown as a single unit, the storage 708 may be a combination of fixed and/or removable storage devices, such as fixed drives, removable memory cards, optical storage, network attached storage (NAS), or storage-area-network (SAN). The network interface 710 may be any type of network communications allowing the computing system 700 to communicate with other computers via a network 718. The computing system 700 also includes I/O devices 716 connected to the computing system 700. For example, the I/O devices 716 may include temperature sensors, wind speed sensors, and RPM sensors.

The processor 704 is programmed to execute temperature control code 712 stored in memory 706, which implements a method of controlling the temperature of a blade in a wind turbine system described below in conjunction with FIG. 9. The temperature control code 712 includes a function of both ambient conditions surrounding the blade and physical conditions of the blade. The ambient conditions and physical conditions may be used to determine a minimum amount of energy that may be applied to the ETH panel such that the blade can reach a target temperature. The memory 706 further includes temperature set points 714. The temperature set points 714 includes the desired end temperature for each blade at several locations in the blade. For example, each location may correspond to a specific ETH panel in the blade.

Figure 10:
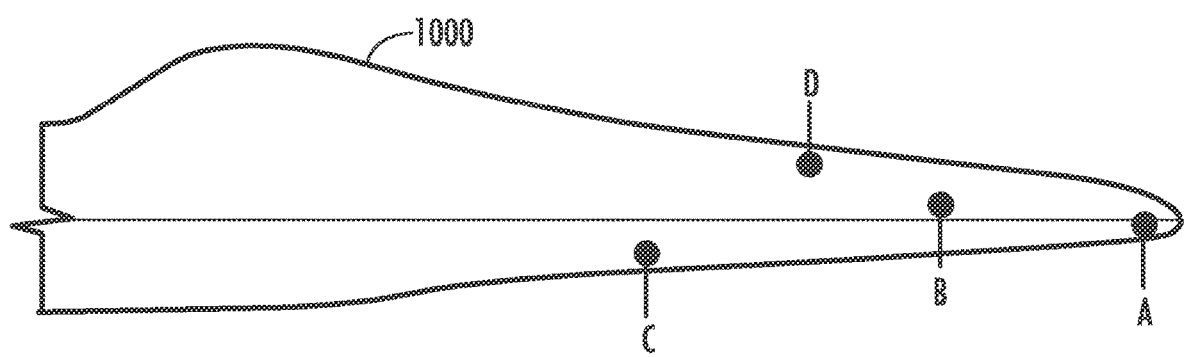
FIG. 10 illustrates a blade in communication with the computing system in FIG. 7, according to one example.

FIG. 10 illustrates a blade 1000, according to one example. The blade 1000 may be in communication with computing system 700. The blade 1000 includes a plurality of location points, Point A, Point B, Point C, and Point D. Each location point A-D corresponds to an ETH element in the blade 1000. Each location point A-D also includes a temperature set point stored in the temperature set points 714. The temperature set point for each location point A-D may differ due to different levels of energy required for each location to reach a target temperature. This is due to the differences in physical conditions of the blade and ambient conditions about the blade at each point.

Referring back to FIG. 7, the temperature control code 712 includes a function that generates a minimum amount of energy to be provided to each ETH panel such that the desired end temperatures stored in the temperature set points 714 may be reached. For example, in FIG. 10 the function may generate a minimum amount of energy that is to be provided to the ETH panel at Point A that differs from the minimum amount of energy that is to be provided to the ETH panel at Point B. This may be due to a variety of factors, such as differences in radius positions, RPMs, chord positions, and the like.

The temperature control code 712 includes an algorithm that generates the energy (or heat flux) that is to be provided to each set location on the blade such that a target temperature, stored in the temperature set points 714, is reached. The algorithm may be represented as the function:

$$E=f(T_{start},T_{max},WS(R,C,RPM),LWC) \quad (1)$$

E represents the energy to be provided to the ETH panel; $T_{start}$ represents the starting temperature; $T_{max}$ represents the plateau or target temperature; WS represents the wind speed over the surface of the blade as a function of the radius position (R), chord position (C), and rotor speed (RPM); and LWC represents the liquid water content of the air.

FIG. 8 is a chart 800 that is generated using the temperature control code 712, according to one example. The chart 800 includes the calculated energy that is to be provided to locations A-D given varying physical conditions and ambient conditions. The physical conditions and ambient conditions correspond to the variables of equation (1) that are stated above.

Figure 9:
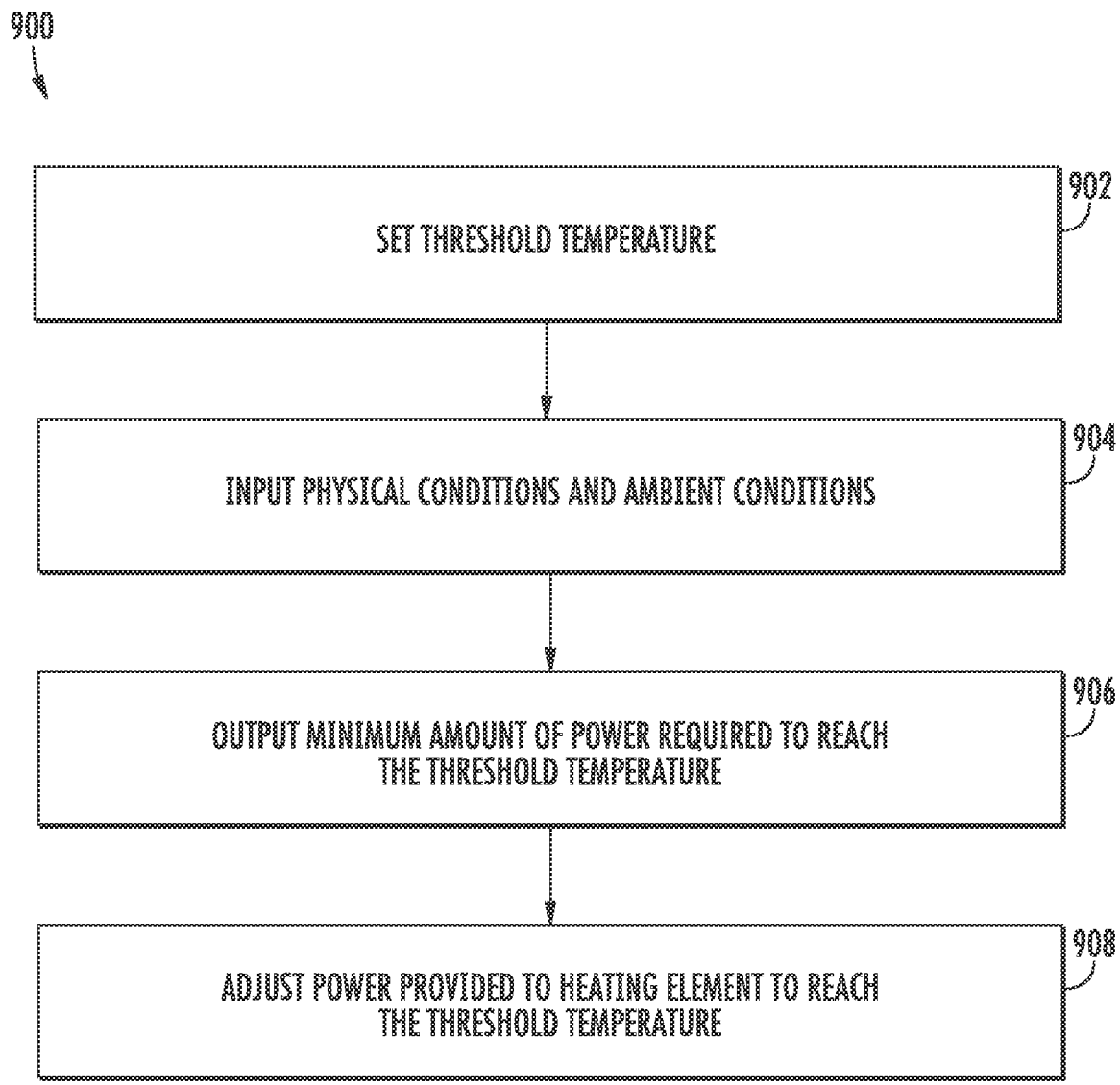
FIG. 9 is a flow diagram for controlling a temperature of a blade in a wind turbine system, according to one example.

FIG. 9 is a flow diagram 900 for controlling the temperature of a blade in a wind turbine system, according to one embodiment. The flow diagram 900 begins at step 902.

At step 902, a user sets a target temperature for a given location in the blade. The target temperature for a given location in the blade may correspond to a given heating element, such as an ETH panel. The target temperature is the temperature at which the heating curve for that location of the blade will plateau, as exemplified in graph 600.

At step 904, physical conditions of the blade and ambient conditions surrounding the blade are inputted. The physical conditions of the blade may include: the rotations per minute (RPM), the angle of the blade, the radius position of the blade, a chord position of the blade, and the material coefficient of the blade. The ambient conditions surrounding the blade may include the outside air temperature and the liquid water content of the air. In one example, ambient conditions in the form of forecast information may be provided directly to the system controller.

At step 906, a minimum amount of energy to be provided to the ETH panel is outputted. The minimum amount of energy outputted is the minimum amount of energy required to reach the target temperature that was set in step 902. The minimum amount of energy is determined based on the physical conditions of the blade and ambient conditions surrounding the blade inputted in step 904. These conditions are inputted into a function that generates the minimum amount of energy required to reach the target temperature. For example, the conditions are inputted to function (1), $E=f(T_{start}, T_{max}, WS(R, C, RPM), LWC)$. In one embodiment, the amount of energy generated is less than the amount of energy needed to reach a material safety limit.

At step 908, the energy provided to the ETH panel is adjusted based on the minimum amount of energy generated in step 904 to reach the target temperature. As the ambient conditions surrounding the blade and the physical conditions of the blade continually change, the inputs of the functions are changed. Thus, the minimum amount of energy required for the ETH panel to reach the target temperature is continually updated. Adjusting the amount of energy provided to the ETH panel includes not only adjusting the wattage provided to the ETH panel, but also the duration that wattage is provided to the ETH panel.

In the preceding, reference is made to examples presented in this disclosure. However, the scope of the present disclosure is not limited to specific described examples. Instead, any combination of the preceding features and elements, whether related to different examples or not, is contemplated to implement and practice contemplated examples. Furthermore, although examples disclosed herein may achieve advantages over other possible solutions or over the prior art, whether or not a particular advantage is achieved by a given example is not limiting of the scope of the present disclosure. Thus, the preceding aspects, features, examples, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the examples disclosed herein may be embodied as a system, method, or computer program product. Accordingly, aspects may take the form of an entirely hardware example, an entirely software example (including firmware, resident software, micro-code, etc.) or an example combining software and hardware aspects that may all generally be referred to herein as a "circuit," "module," or "system." Furthermore, aspects may take the form of a computer program product embodied in one or more computer readable medium(s) having computer readable program code embodied thereon. Program code embodied on a computer readable medium may be transmitted using any appropriate medium, including but not limited to wireless, wireline, optical fiber cable, RF, etc., or any suitable combination of the foregoing.

Aspects of the present disclosure are described above with reference to flowchart illustrations and/or block diagrams of methods, apparatus (systems), and computer program products according to examples presented in this disclosure. It will be understood that each block of the flowchart illustrations and/or block diagrams, and combinations of blocks in the flowchart illustrations and/or block diagrams, can be implemented by computer program instructions. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods, and computer program products according to various examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method of controlling a temperature of a blade in a wind turbine system, the method comprising:
   setting, using a controller of the wind turbine system, a target temperature for a first location of a plurality of locations along the blade, wherein a respective heating element is arranged at each location of the plurality of locations;
   receiving, at the controller, values for one or more physical conditions of the blade and one or more ambient conditions about the blade;
   determining, using the controller and based on the one or more physical conditions and the one or more ambient conditions, a minimum amount of energy to be provided to a first heating element at the first location required to reach the target temperature; and
   controlling, using the controller, an energy provided to the first heating element in accordance with the minimum amount of energy.

2. The method of claim 1, wherein the one or more ambient conditions include one or both of an outside air temperature and a wind speed.

3. The method of claim 1, wherein the one or more ambient conditions include a liquid water content of air.

4. The method of claim 1, wherein the one or more physical conditions include one or more of: a rotational speed of the blade, an angle of the blade, a radius position of the first location, a chord position of the first location, and a material coefficient of the blade.

5. The method of claim 1, wherein setting the target temperature comprises:
   limiting the target temperature to not exceed a material safety limit of the blade.

6. The method of claim 1, further comprising:
   continuously receiving updated values for one or both of: the one or more ambient conditions and the one or more physical conditions;
   determining, based on the updated values, an updated value of the minimum amount of energy to reach the target temperature; and
   controlling the energy provided to the first heating element in accordance with the updated value of the minimum amount of energy.

7. The method of claim 1, wherein controlling the energy provided to the first heating element comprises:
   adjusting a length of time that energy is provided to the first heating element.

8. The method of claim 1, wherein the one or more physical conditions of the blade comprise a first physical condition referenced to the first location.

9. The method of claim 8, wherein the first physical condition comprises one of: a radius position of the first location, and a chord position of the first location.

10. The method of claim 1, wherein determining the minimum amount of energy comprises:
    determining a wind speed based on a radius position of the first location, a chord position of the first location, and a rotational speed of the blade.

11. The method of claim 10, wherein determining the minimum amount of energy comprises:
    applying a starting temperature, the target temperature, the wind speed, and a liquid water content of air to a predefined function.

12. The method of claim 1, wherein determining the minimum amount of energy to be provided to the first heating element at the first location is performed without a temperature sensor at the first location.

13. A controller for a wind turbine system, comprising:
    a processor; and
    a memory storing program code, which, when executed on the processor performs an operation for controlling a temperature of a blade in the wind turbine system, the operation comprising:
       setting a target temperature for a first location of a plurality of locations along the blade, wherein a respective heating element is arranged at each location of the plurality of locations;
       receiving values for one or more physical conditions of the blade and one or more ambient conditions about the blade;
       determining, based on the one or more physical conditions and the one or more ambient conditions, a minimum amount of energy to be provided to a first heating element at the first location required to reach the target temperature; and
       controlling an energy provided to the first heating element in accordance with the minimum amount of energy.

14. The controller of claim 13, wherein the one or more ambient conditions include one or both of an outside air temperature and a wind speed.

15. The controller of claim 13, wherein the one or more ambient conditions include a liquid water content of air.

16. The controller of claim 13, wherein the one or more physical conditions include one or more of: a rotational speed of the blade, an angle of the blade, a radius position of the first location, a chord position of the first location, and a material coefficient of the blade.

17. The controller of claim 13, wherein setting the target temperature comprises:
    limiting the target temperature to not exceed a material safety limit of the blade.

18. The controller of claim 13, the operation further comprising:
    continuously receiving updated values for one or both of: the one or more ambient conditions and the one or more physical conditions;
    determining, based on the updated values, an updated value of the minimum amount of energy to reach the target temperature; and
    controlling the energy provided to the first heating element in accordance with the updated value of the minimum amount of energy.

19. The system controller of claim 13, wherein controlling the energy provided to the first heating element comprises:
    adjusting a length of time that energy is provided to the first heating element.

20. A computer readable storage medium having stored thereon instructions that, when executed by a processor, cause the processor to perform an operation of controlling a temperature of a blade in a wind turbine system, the operation comprising:
    setting a target temperature for a first location of a plurality of locations along the blade, wherein a respective heating element is arranged at each location of the plurality of locations;

receiving values for one or more physical conditions of the blade and one or more ambient conditions about the blade;

determining, based on the one or more physical conditions and the one or more ambient conditions, a minimum amount of energy to a first heating element at the first location required to reach the target temperature;

controlling an energy provided to the first heating element in accordance with the minimum amount of energy.

* * * * *